US008378664B2

(12) United States Patent
Hinz

(10) Patent No.: US 8,378,664 B2

(45) Date of Patent: Feb. 19, 2013

(54) ARRANGEMENT COMPRISING A MAGNETIC-FIELD-DEPENDENT ANGLE SENSOR

(75) Inventor: Michael Hinz, Oelde (DE)

(73) Assignee: NXP B.V., Eindhoven (NL)

( * ) Notice: Subject to any disclaimer, the term of this patent is extended or adjusted under 35 U.S.C. 154(b) by 1515 days.

(21) Appl. No.: 10/561,733

(22) PCT Filed: Jun. 16, 2004

(86) PCT No.: PCT/IB2004/050918

§ 371 (c)(1), (2), (4) Date: Jul. 20, 2009

(87) PCT Pub. No.: WO2004/113928

PCT Pub. Date: Dec. 29, 2004

(65) Prior Publication Data

US 2010/0085038 A1 Apr. 8, 2010

(30) Foreign Application Priority Data

Jun. 25, 2003 (EP) .................................... 03101872

(51) Int. Cl.
*G01B 7/14* (2006.01)

(52) U.S. Cl. .......... 324/207.13; 324/207.21; 324/207.25

(58) Field of Classification Search ............. 324/207.13, 324/207.21, 207.25, 252

See application file for complete search history.

(56) References Cited

U.S. PATENT DOCUMENTS 5,055,781 A * 10/1991 Sakakibara et al. ..... 324/207.21
5,982,171 A * 11/1999 Umemoto et al. ....... 324/207.21
6,011,390 A * 1/2000 Loreit et al. ............. 324/207.21
6,064,197 A * 5/2000 Lochmann et al. ...... 324/207.14
6,326,781 B1 12/2001 Kunde et al.
6,448,763 B1 * 9/2002 Spellman ................. 324/207.21
6,545,462 B2 * 4/2003 Schott et al. ............... 324/207.2
6,707,293 B2 * 3/2004 Wan et al. ................ 324/207.25
6,806,702 B2 * 10/2004 Lamb et al. .............. 324/207.25
6,867,584 B1 * 3/2005 Kurita et al. ............. 324/207.25
2003/0128031 A1 * 7/2003 Doescher ...................... 324/252
2004/0095131 A1 * 5/2004 Withanawasam et al. ........................ 324/207.21
2005/0030012 A1 * 2/2005 Kunz-Vizenetz ........ 324/207.25

FOREIGN PATENT DOCUMENTS

JP 2000314640 A 11/2000
JP 2001091208 A 4/2001
JP 2003004480 A 1/2003

OTHER PUBLICATIONS

K. Dietmayer, M. Wester: “Contactless Angle Measurement” Philips Semiconductors Application Note AN00004, Jan. 17, 2000.

J. Grieger: “Magetoresistive Sensoren” Elektronik Industrie, No. 5, 1999, p. 28-31.

* cited by examiner

*Primary Examiner* — Arleen M Vazquez

(57) ABSTRACT

In order to reduce the dimensions of the mechanical components and the number and size of the sensory and electronic components in an arrangement comprising a magnetic-field-dependent angle sensor which is effectively connected to a magnetic transmitter which is arranged such that it can rotate with respect to the angle sensor, while maintaining or improving the resolution of the output signal, the angle sensor is formed by at least one magnetoelectric converter, the electrical properties of which are dependent on the magnetic field strength but independent of the polarity of the magnetic field acting on the at least one converter. The magnetic field strength is selected such that the at least one converter is controlled in saturation.

11 Claims, 2 Drawing Sheets

ARRANGEMENT COMPRISING A MAGNETIC-FIELD-DEPENDENT ANGLE SENSOR

The invention relates to an arrangement comprising a magnetic-field-dependent angle sensor which is effectively connected to a magnetic transmitter which is arranged such that it can rotate with respect to the angle sensor.

Arrangements in accordance with the preamble are used in a highly varied way for position measurement, rotation angle measurement, rotational speed measurement and to detect the direction of rotation. A permanent magnet is usually rotated or moved linearly depending on whether a rotational movement or a linear movement is to be determined. One known arrangement of this type for rotational speed measurement has magnetoresistive elements in which the output signal depends linearly on the magnetic field strength and hence also on the polarity or sign of the field lines. In this case, the magnetoresistive elements are part of a bridge circuit which in the case of a rotation sensor generates an essentially sinusoidal output signal. The number of sinusoidal oscillations per revolution is then equal to the number of pole pairs of the magnetic transmitter.

It is an object of the invention to reduce the dimensions of the mechanical components and the number and size of the sensory and electronic components while maintaining or improving the resolution of the output signal.

This object is achieved by the arrangement according to the invention in that the angle sensor consists of at least one magnetoelectric converter, the electrical properties of which are dependent on the magnetic field strength but independent of the polarity of the magnetic field acting on the at least one converter, and in that the magnetic field strength is selected such that the at least one converter is controlled in saturation.

The arrangement according to the invention has the advantage that a high resolution is possible in the case of simple mechanical components, particularly the moving components, and this is particularly advantageous in automotive technology. Suitable converters are all magnetoelectric converters the electrical output variable of which is not dependent on the polarity or sign of the magnetic field. In the invention it is preferably provided that the at least one converter is a magnetoresistive element.

One advantageous development of the invention consists in that the angle sensor is formed by at least one bridge circuit which consists of four geometrically arranged magnetoelectric converters. It is preferably provided that the converters are arranged in a circular manner.

A further increase in the resolution is possible in the arrangement according to the invention in accordance with one development in that at least one further bridge circuit is provided, the converters of which are arranged in a manner such that they alternate with the converters of the at least one bridge circuit, in the movement direction of the magnet. For many applications, it has proven advantageous to provide a total of two bridge circuits. Converters comprising a number of bridge circuits or in an arrangement that differs from the one mentioned above are also conceivable.

A further advantageous refinement consists in that the output signal of the at least one bridge circuit is converted into a binary signal. The resulting binary signal has two flanks per pole pair of the magnet. If there are a number of bridge circuits, there is in each case a phase-shifted signal, depending on the arrangement of the bridge circuits. The binary signals may be linked by means of simple logic so that there are a number of flanks per pole pair.

By virtue of another advantageous development, a higher resolution is achieved in that the output signals of at least two bridge circuits are converted into a signal that changes linearly with the movement of the magnet, by applying an inverse trigonometric function. Apart from further processing of this signal as an analog signal, a digital signal can be derived from this signal by means of an analog/digital converter or else a binary signal of higher frequency can be derived therefrom by means of comparators.

The invention will be further described with reference to examples of embodiments shown in the drawings to which, however, the invention is not restricted.

Figure 1:
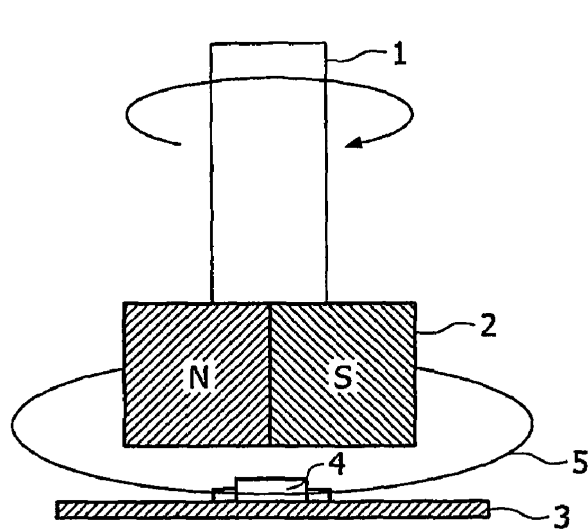
FIG. 1 shows a schematic diagram of an arrangement according to the invention, in side view.

In the example of embodiment shown in FIG. 1, a permanent magnet 2 comprising the poles N and S is located on a rotating shaft 1, the rotational speed and/or angular position a of which are to be measured. A magnetoresistive angle sensor 4 is arranged on a printed circuit board 3, which magnetoresistive angle sensor is flowed through by magnetic force lines 5 coming from the permanent magnet 2.

Figure 2:
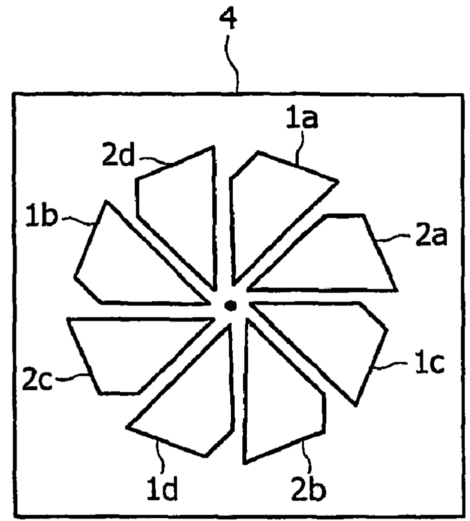
FIG. 2 shows a plan view of the angle sensor used in the example of embodiment shown in FIG. 1, likewise in the form of a schematic diagram.
Figure 3:
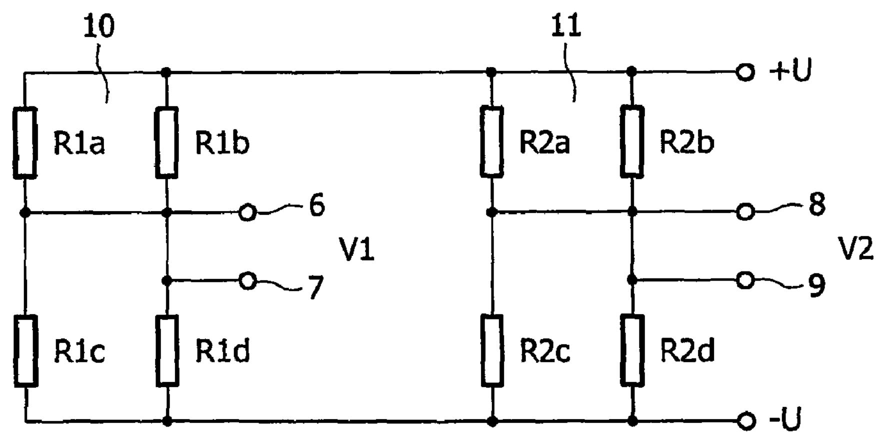
FIG. 3 shows the connection of the magnetoresistive elements to form two bridge circuits.
Figure 7:
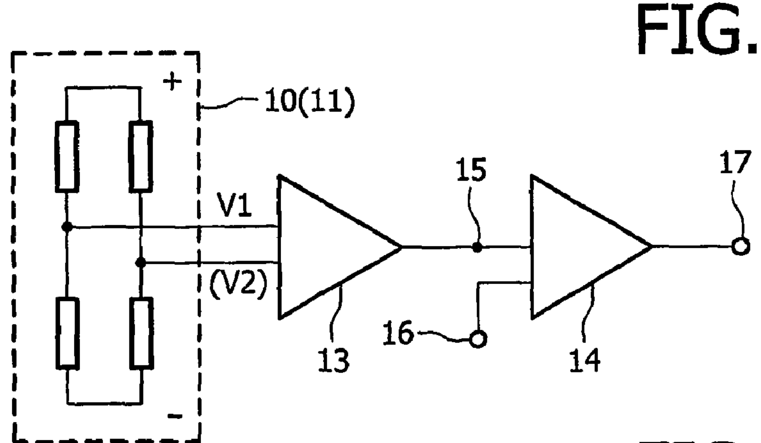
FIG. 7 shows an example of a simple comparator circuit for deriving the rectangular pulses shown in FIGS. 5 and 6.

The angle sensor 4 has—as can be seen in FIG. 2—eight approximately sector-shaped magnetoresistive elements. In each case four of these elements are connected in the form of a bridge circuit, which for the sake of clarity has not been shown in FIG. 2 but rather is shown in a circuit diagram in FIG. 3. The magnetoresistive elements 1*a* to 1*d* form a first bridge circuit 10 from the resistor values R1*a* to R1*d* with terminals 6, 7, between which the output voltage V1 is present. The magnetoresistive elements 2*a* to 2*d* form a second bridge circuit 11 with the resistor values R2*a* to R2*d* and terminals 8, 9 with the output voltage V2.

Figure 4:
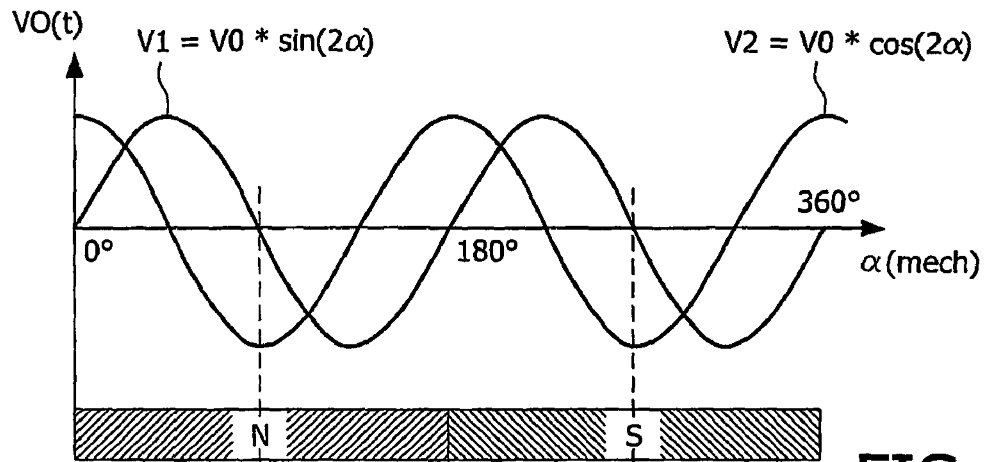
FIG. 4 shows the output voltages of the bridge circuits during one revolution.

During one revolution of the magnet 2 (FIG. 1), the voltages shown in FIG. 4 are produced, namely V1=V0 sin(2*a*) and V2=V0 cos(2*a*). Rectangular pulses can be derived from the sinusoidal voltages by means of a simple comparator circuit which will be explained below with reference to FIG. 8. The rectangular pulses derived from V1 and V2 are then passed over a logic circuit, which produces the rectangular signal shown in FIG. 5.

Figure 5:
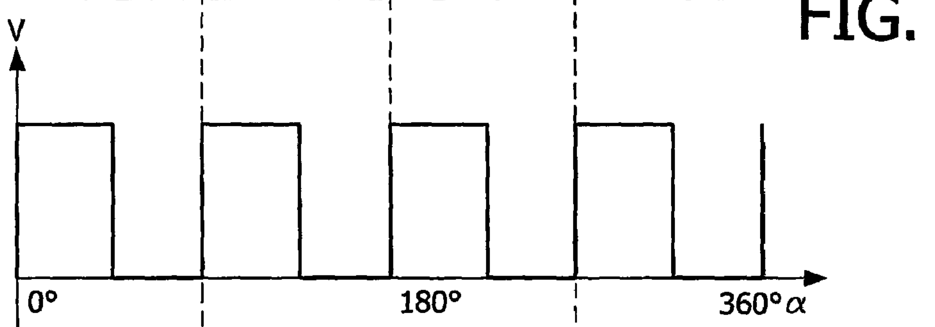
FIG. 5 shows a pulsed signal, formed from the output voltages shown in FIG. 4, with four pulses per revolution.
Figure 6:
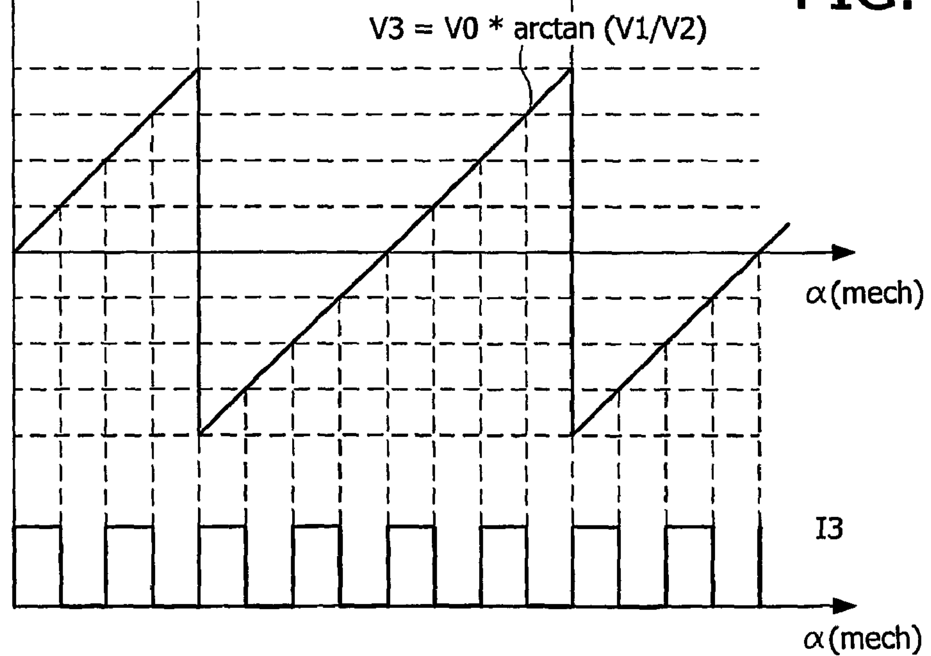
FIG. 6 shows a diagram for deriving pulses of higher frequency of, for example, eight pulses per revolution.

FIG. 6 shows another possibility for deriving rectangular pulses from the sinusoidal voltages, wherein the rectangular pulses have a higher frequency than those shown in FIG. 5. For this purpose, a voltage V3=V0 arctan(V1/V2) which changes linearly with the angle a is derived from V1 and V2, for example by means of a CORDIC algorithm. The pulsed signal I3 shown in FIG. 6 is then produced by means of a number of comparators, wherein eight pulses are generated per revolution of the permanent magnet.

In order to generate rectangular pulses, the output signal V1 or V2 of a bridge circuit 10 or 11 is fed to a difference amplifier 13, the output of which is connected to an input 15 of the comparator 14. A reference voltage Vref is fed to the other input 16 of said comparator 14. The desired rectangular signal is then available at the output 17.

The invention claimed is:

1. An arrangement comprising a magnetic-field-dependent angle sensor which is effectively connected to a magnetic transmitter which is arranged such that it can rotate with respect to the angle sensor, characterized in that the angle sensor consists of at least one magnetoelectric converter, the electrical properties of which are dependent on the magnetic field strength but independent of the polarity of the magnetic field acting on the at least one converter, and in that the magnetic field strength is selected such that the at least one converter is controlled in saturation, wherein the rotation direction of the magnetic transmitter is in parallel with the angle sensor.

2. An arrangement as claimed in claim 1, characterized in that the at least one converter is a magnetoresistive element.

3. An arrangement as claimed in claim 1, characterized in that the angle sensor is formed by at least one bridge circuit which consists of four geometrically arranged magneto electric converters.

4. An arrangement as claimed in claim 3, characterized in that the converters are arranged in a circular manner.

5. An arrangement as claimed in claim 3, characterized in that at least one further bridge circuit is provided, the converters of which are arranged in a manner such that they alternate with the converters of the at least one bridge circuit, in the movement direction of the magnet.

6. An arrangement as claimed in claim 3, characterized in that the output signal of the at least one bridge circuit is converted into a binary signal.

7. An arrangement as claimed in claim 5, characterized in that the output signals of at least two bridge circuits are converted into a signal that changes linearly with the movement of the magnet, by applying an inverse trigonometric function.

8. The arrangement of claim 1, wherein the magnetic transmitter is a permanent magnet located on a rotating shaft, and wherein the angle sensor is arranged on a printed circuit board.

9. The arrangement of claim 1, wherein the angle sensor includes eight approximately sector-shaped magnetoresistive elements.

10. An arrangement comprising a magnetic-field-dependent angle sensor which is effectively connected to a magnetic transmitter which is arranged such that it can rotate with respect to the angle sensor, characterized in that the angle sensor consists of at least one magnetoelectric converter, the electrical properties of which are dependent on the magnetic field strength but independent of the polarity of the magnetic field acting on the at least one converter, and in that the magnetic field strength is selected such that the at least one converter is controlled in saturation, wherein the magnetic transmitter is a permanent magnet located on a rotating shaft, and wherein the angle sensor is arranged on a printed circuit board.

11. An arrangement comprising a magnetic-field-dependent angle sensor which is effectively connected to a magnetic transmitter which is arranged such that it can rotate with respect to the angle sensor, characterized in that the angle sensor consists of at least one magnetoelectric converter, the electrical properties of which are dependent on the magnetic field strength but independent of the polarity of the magnetic field acting on the at least one converter, and in that the magnetic field strength is selected such that the at least one converter is controlled in saturation, wherein the angle sensor includes eight approximately sector-shaped magnetoresistive elements.

* * * * *